United States Patent
Lai (12)
(10) Patent No.: US 6,285,878 B1
(45) Date of Patent: Sep. 4, 2001

(54) BROADBAND WIRELESS COMMUNICATION SYSTEMS PROVIDED BY COMMERCIAL AIRLINES

(76) Inventor: Joseph Lai, 1251 W. Sepulveda Blvd., #347, Torrance, CA (US) 90502

( * ) Notice: Subject to any disclaimer, the term of this patent is extended or adjusted under 35 U.S.C. 154(b) by 0 days.

(21) Appl. No.: 09/097,168

(22) Filed: Jun. 12, 1998

(51) Int. Cl.$^7$ ...................................................... H04Q 7/20
(52) U.S. Cl. ........................ 455/431; 455/428; 455/430
(58) Field of Search ................................... 455/430, 431, 455/12.1, 428

(56) References Cited

U.S. PATENT DOCUMENTS

| | | | |
|---|---|---|---|
| 5,136,295 | * | 8/1992 | Bull et al. ............................... 342/15 |
| 5,450,329 | * | 9/1995 | Tanner ................................... 364/449 |
| 5,519,761 | * | 5/1996 | Gilhousen ............................... 379/59 |
| 5,530,909 | * | 6/1996 | Simon et al. ........................ 455/11.1 |
| 5,559,865 | * | 9/1996 | Gilhousen ............................... 379/60 |
| 5,592,470 | * | 1/1997 | Rudrapatna et al. ................ 370/320 |
| 5,832,380 | * | 11/1998 | Ray et al. ............................. 455/431 |
| 5,878,034 | * | 3/1999 | Heshey et al. ........................ 370/321 |
| 5,887,258 | * | 3/1999 | Lemozit et al. ....................... 455/431 |
| 6,018,659 | * | 1/2000 | Ayyagari et al. ..................... 455/431 |
| 6,021,797 | * | 3/2001 | Leuca et al. ........................... 370/316 |
| 6,047,165 | * | 4/2000 | Wright et al. ........................... 455/66 |
| 6,061,562 | * | 5/2000 | Martin et al. ......................... 455/431 |

* cited by examiner

*Primary Examiner*—Daniel Hunter
*Assistant Examiner*—Thuan T. Nguyen (57) ABSTRACT

A new use for the (already existing) fleets of commercial airline aircraft to replace low-earth orbit (LEO) communication satellites. This invention will provide low-cost, broadband wireless communication infrastructure among points-to-points accomplished by using and modifying existing, small, lightweight low power, low cost microwave relay station equipment onboard the commercial airline aircraft. Each equipped aircraft would have a broadband wireless communication link (within line-of-sight coverage ranges) to one or more neighboring aircraft or ground stations and form a chain of seamless airborne repeaters providing broadband wireless communication gateways along the entire flight path. Broadband wireless communication services also provide for customers onboard in-flight as well as customers overboard, along the line-of-sight ranges of flight path from the commercial airline aircraft.

17 Claims, 8 Drawing Sheets

BROADBAND WIRELESS COMMUNICATION SYSTEMS PROVIDED BY COMMERCIAL AIRLINES

FIELD OF THE INVENTION

This invention relates to new use and methods for transoceanic long-distance broad band data communications and, specially, new use and methods for communication using fleets of commercial aircraft as the low-flying-communication satellite infrastructure capable of real-time broad band data and network applications.

BACKGROUND OF THE INVENTION

Airplane was invented almost one hundred years ago. (1903, by the Wright brothers) In the beginning, their size, speed, altitude, range and payload capabilities were all very limited. As years went by, airplanes became much more powerful and air travel became a big business. Fleets of airplanes carrying passengers and cargo became an industry called "commercial airlines".

Today's big commercial airlines, such as United Airlines or American Airlines, have huge fleets of planes flying from all over the world to all over the world. And their Jumbo jets can carry hundreds of passengers or tons of cargo and reach its destinations within hours.

Meanwhile, the long-distance telecommunication industry also became a major player for linking up people. The travel business and the telecommunication business can not be separated since once the passenger reaches their destination, they will call their friends, family members or business associates or vice versa. Of course, not just travelers have the telecommunication needs.

Currently, transoceanic communication technologies rely heavily on either underwater submarine fiber optics cables or communication satellites. Both system are extremely expensive and have their drawbacks.

The fiber optics cable is good for land-line based technology (versus wireless system), it is extremely expensive to install (even on land) but cheap for its bandwidth(after installed). It takes years to plan and deploy the system but the system can carry heavy loads of broad band data. The fiber optics system, just like any of the wired systems has its major drawback in that it is very expensive to cross water; i.e. ocean sea or lake. Also, it is not economical to install underwater fiber in the less populated regions since the investment is huge and the system has tremendous bandwidth but may lack customers or applications to pay for it.

The other dying industry is communication satellites that are dedicated for serving real-time data. Communication satellites are also extremely expensive, with its weak signals, limited bandwidth, short life expectancy, bad propagation delay and vulnerable to the hostile space environment. The communication satellite is a wireless systems has the advantage that it can be quickly deployed into the orbit in space for quicker services than the fiber optics cable systems.

Using microwave relay station to linkup from point to point was common in the 60's. The mountain top repeaters operated as "line-of-sight" bridges. The wireless signals hopped from repeater to next repeater until it reached its destination. However, the microwave relay station also has its major drawbacks in that it is not feasible to install the repeaters on the water (across ocean) and their bandwidth is limited compare to the fiber optics cables so these microwave relay stations are also becoming obsolete.

Accordingly, there are big demands for an alternative new long-distance telecommunication infrastructure that is low cost, the infrastructure that already exists (for other applications), equipment can be easily installed, easily maintained telecommunication system and capable of broad band data. The present invention is directed to providing such a new telecommunication system.

SUMMARY OF THE INVENTION

The present invention provides a transoceanic broad band wireless data communication system solution without those current systems drawbacks. The system provides hub cities to hub cities telecommunication needs by utilizing fleets of commercial aircraft to act as the constellation of low-flying communication satellites that linkup the wireless signals.

More than one fleet of commercial aircraft have to be used for this linkup; i.e. since crossing the ocean such as the pacific ocean across San Francisco to Tokyo is around 5,000 miles. The line-of-sight range of these commercial aircraft that fly at typical cruising altitude of 40,000 feet is 240 miles radius. These commercial aircraft could send the broad band wireless data to the next aircraft ahead/behind for another 240 miles; thus giving the maximum line-of sight (LOS) radio frequency range of 480 miles at 40,000 feet.

To carry forward signals for 5,000 miles, at its ideal condition, ten or more commercial aircraft would be required. Signals takeoff (transmitted) from San Francisco relay station tower (at 40,000 feet) will be received within 480 miles (of its west direction) to the first airborne aircraft, then repeated by the first aircraft to the second (keeping going west), then the third . . . finally landing (received) at the Tokyo relay station. These fleets of commercial aircraft have to travel accordingly to fill the communication gaps at same speed, same direction and within its LOS ranges (max. 480 miles @ 40,000 feet) to form the constellation as the low-flying-satellites and make the connection. However, popular routes have commercial aircraft fly from hub cities to hub cities on an increasingly busy schedule. The broad band wireless data link is not limited (to only one channel) but depend on the density of these fleets of the commercial aircraft.

Throughout aviation history, airplanes have only been used to carry passengers and cargo. Now is the time for these commercial airlines to realize their self-imposed limitation and add electronic signal (broad band wireless data) for the telecommunication industry as their new cargo. This invention introduces a new use of the existing technologies and paves the way for the next generation of economical transoceanic or point to point telecommunication applications.

There is almost no cost to the commercial airliners which are already in the air. The equipment can be small, lightweight, low-cost and low-power. In the case of onboard equipment failure; the commercial aircraft crew could troubleshoot it over-the-air or wait until the aircraft landed for services. For the commercial airliners, not only do they get paid for the data they carry but the airliners themselves could also benefit by using the same telecommunication system for aviation communication, aide to navigation, provide in-flight telecommunications (news, phone call, provide Internet services and etc . . . ) and entertainment services to its passengers.

| | Aircraft linkup | Comm. Satellites | Underwater Fiber optics |
|---|---|---|---|
| COMPARISON FOR TRANSOCEANIC TELECOMMUNICATION CARRIERS | | | |
| Planning cost | Low | High | extremely high |
| Equiptment cost | Low | very high | extremely high |
| Installation cost | very low | extremely high | extremely high |
| Installation time | low | low | extremely high |
| Installation risk | low | extremely high | high |
| Operating cost | Low | Low | high |
| Maintenance cost | Low | high (always need adjust) | extremely high |
| Equiptment life | extremely long | very short (5 years ?) | medium (10 years? got be seaworthy!) |
| Bandwidth | high (the distance is shorter) | low | extremely high |
| Reliability | high | low (satellites always fail) | low (system is very complicated With too many variables) |
| Data integrity | good | low | extremely high |
| Real time Voice quality | very good | terrible; due to Propagation delay (geo-stationary sat.) | very good |
| Flexibility | high | poor | noon |
| Against disasters | high | poor | poor |
| Overall performance | high | low | medium |
| Overall cost ratio (based on 20 years) | 1 | 50 | 100 |

DETAILED DESCRIPTION

The hub to hub transoceanic communication linkup system of the present invention extends the usage of existing microwave repeater (relay station) technologies by using the commercial aircraft that carries the signal repeater equipment onboard and flying between these hub cities as low-flying communication satellites. Unlike the conventional communication satellites, these commercial aircraft based low-flying-satellites landed to ground for maintenance every few hours and no need for rockets (or space shuttles) to launch them again for their next communication services.

Figure 1:
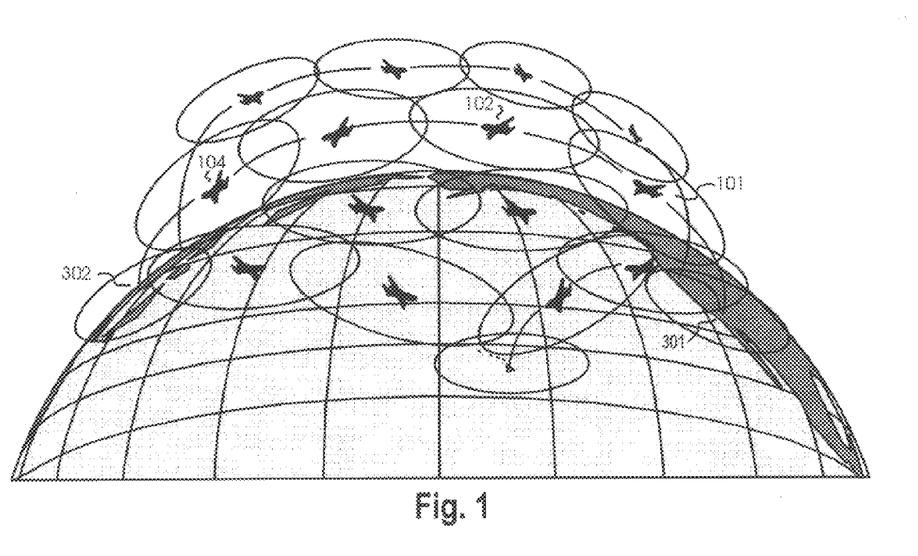
FIG. 1 shows the hub to hub linkup system of the present invention

As shown in FIG. 1, each commercial aircraft manages their own routine flights. Some just takeoff 101, others are cruising 102 and some are about to land 104. These fleets of aircraft are networking together to relay broad band wireless data as repeaters.

Wireless radio frequency signals lose their signal strength and fadeout when the distance from its transmission sources increased. Before the signal completely faded, the repeater system that relaying the signal is required; for (1) pickup and receiving the weak signal from the source direction (2) amplifying the signal, then (3) retransmitting the same signal just received to the destination direction. Typical microwave radio system communication range is base on its transmission power and its line-of-sight coverage ranges. The line-of-sight is a major factor for communication range since these microwave signals can not bounce around in the sky as the low frequency radio waves can.

A. The nature of our Global earth

The round Global earth is roughly around 8,000 miles in diameter. Since the global earth is round (like a ball) and not flat, the line-of-sight is directly related to the heights of its location. The higher the altitude, the wider the line-of-sight coverage range for the wireless signal can be reached.

B. Formula of Radio-Line-Of-Sight (RLOS)

Based on the theory of Very High Frequencies (VHF, above 30 Mhz) transmission, the overall rule of signal propagation is limited to radio-line-of-sight (RLOS). The radio waves travel beyond the horizon then bend down . . . and have a little extra of range than the geometric line-of-sight. After all, the higher the tower, the better the range. The formula of the RLOS is given as:

RLOS Range=1.2×(square-root of the height in feet) so for example;

The height is 40,000 feet; the square-root of 40,000 is equal to 200.

Figure 2:
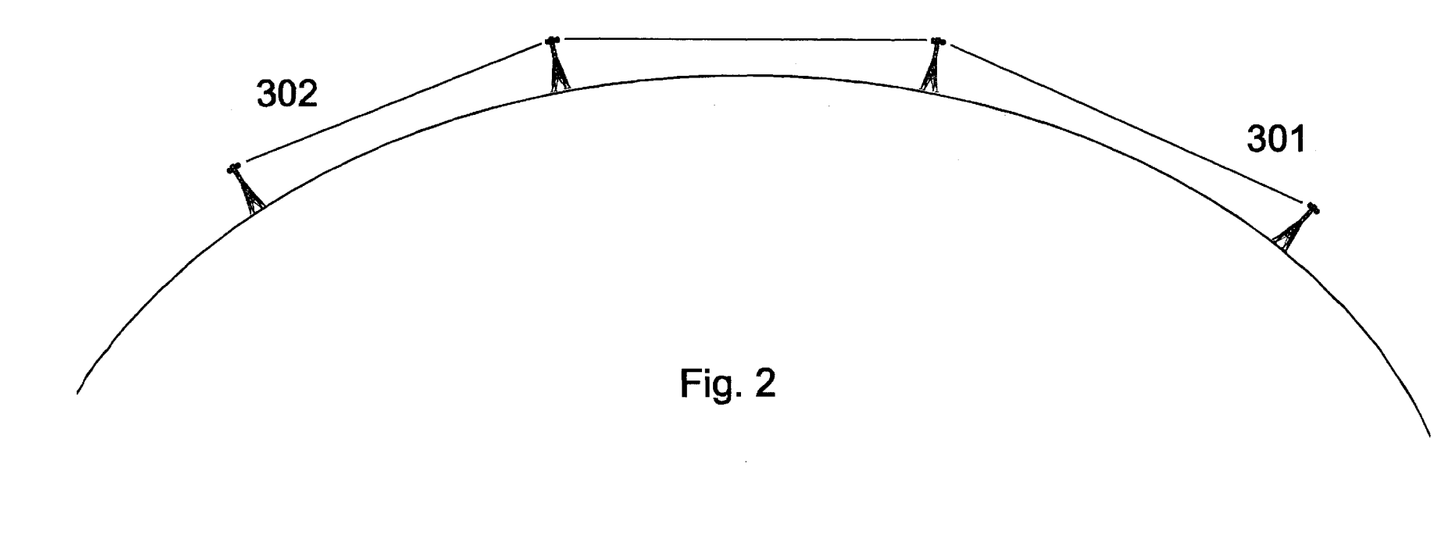
FIG. 2 shows the typical existing land-based microwave wireless link using tower
Figure 3:
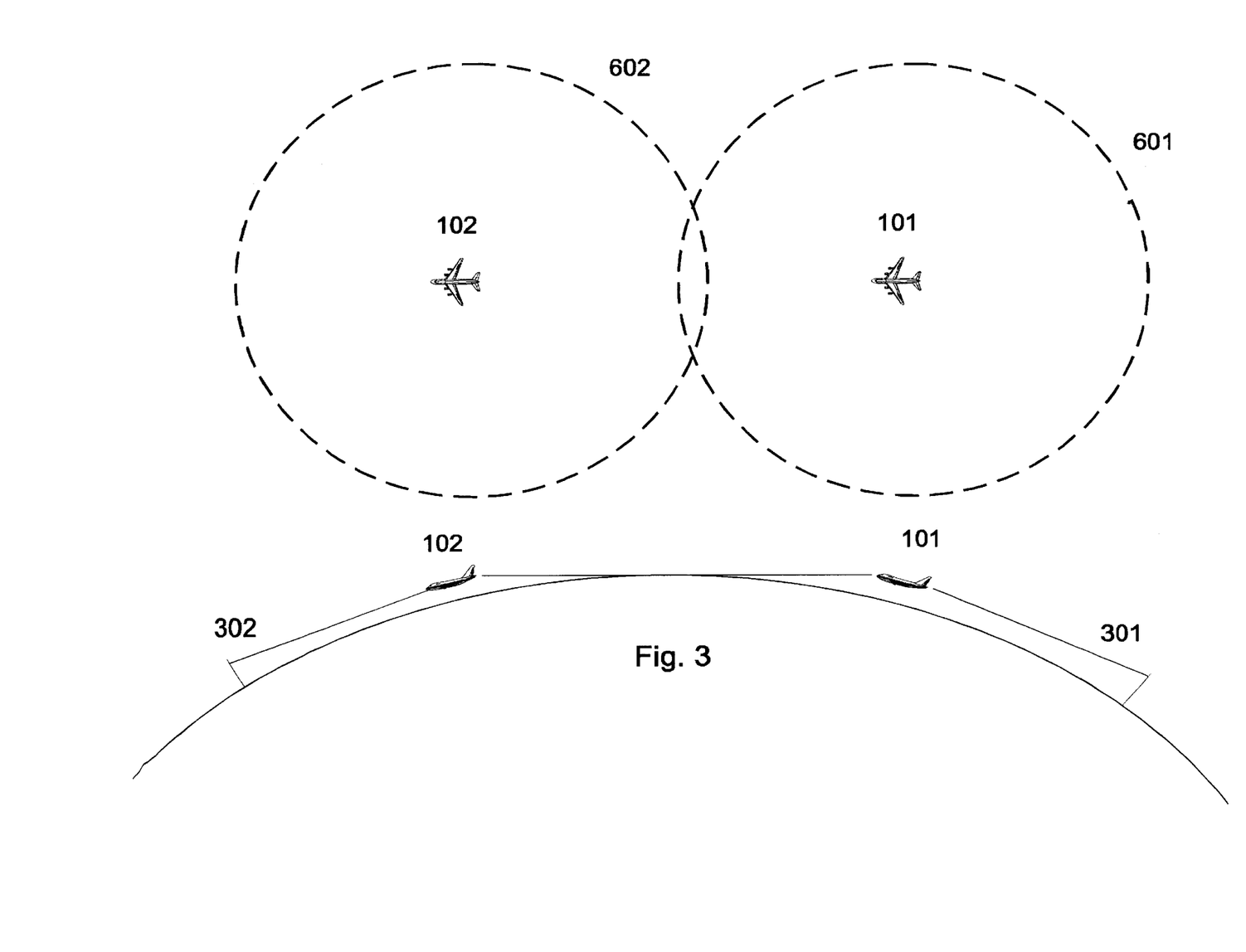
FIG. 3 shows the broad band microwave wireless link use commercial aircraft

200×1.2=240 miles 40,000 feet is the typical cruising altitude for most transoceanic aircraft. At that altitude, the horizon radius the aircraft can reach is around 240 miles. However, the radio signal will pass the horizon and shoot straight toward outer space and keep going until the signal is completely faded-out. Within line-of-sight range, if there were other commercial aircraft around, the wireless signal can be picked-up (received) and retransmitted. The line-of-sight of these two neighboring aircraft is thereby doubled its the range to 480 miles at 40,000 feet. FIG. 2 shows the microwave repeater system using towers and as we do know that it is not possible to install towers at the midele of the ocean. FIG. 3 shows the flying tower repeater carried by commercial aircraft. Note that 601 and 602 is the line of sight range of the aircraft to the horizon at sea level (240 miles @ 40,000 feet) but the actual linkup range for these two aircraft 101 102 is double to 480 miles.

Typically, these commercial aircraft reach the 40,000 feet altitude within their first hour of flight, then they do maintain that altitude until the last hour of final approach.

Of course, these commercial aircraft cruising at 40,000 feet are not stay there just to be our repeaters. They all have to keep busy and flying toward their destination airports. Hand-off techniques (same as the cellular phone repeater, except the cellular phone doesn't move, the cell-site moves) have to be implemented so once the first 101 aircraft that linkup to the ground station 301 travel almost beyond the ground station range has to be replaced by the next aircraft (just took off) that tailing it 101. Also, if there is no aircraft at all to fill the gap in time, the entire broad band wireless data communication linkup is broken.

Initially, there won't be enough commercial aircraft that just happen to be in the right places (over-the-air) all the time to do this linkup without their schedules modified. However, the travel business is a strong growing business, the airlines have to keep adding flights all the time to transport more passengers and cargo. Pretty soon, the sky is going to be like cars in the freeway that filled-up with airplanes and these aircraft equipped with broad band wireless data links themselves together without any pre-planned flight schedules.

C. Equipment Specifications

The hub to hub linkup system basically consists of a two part operation:

(1) Ground Base Station Unit

Figure 8:
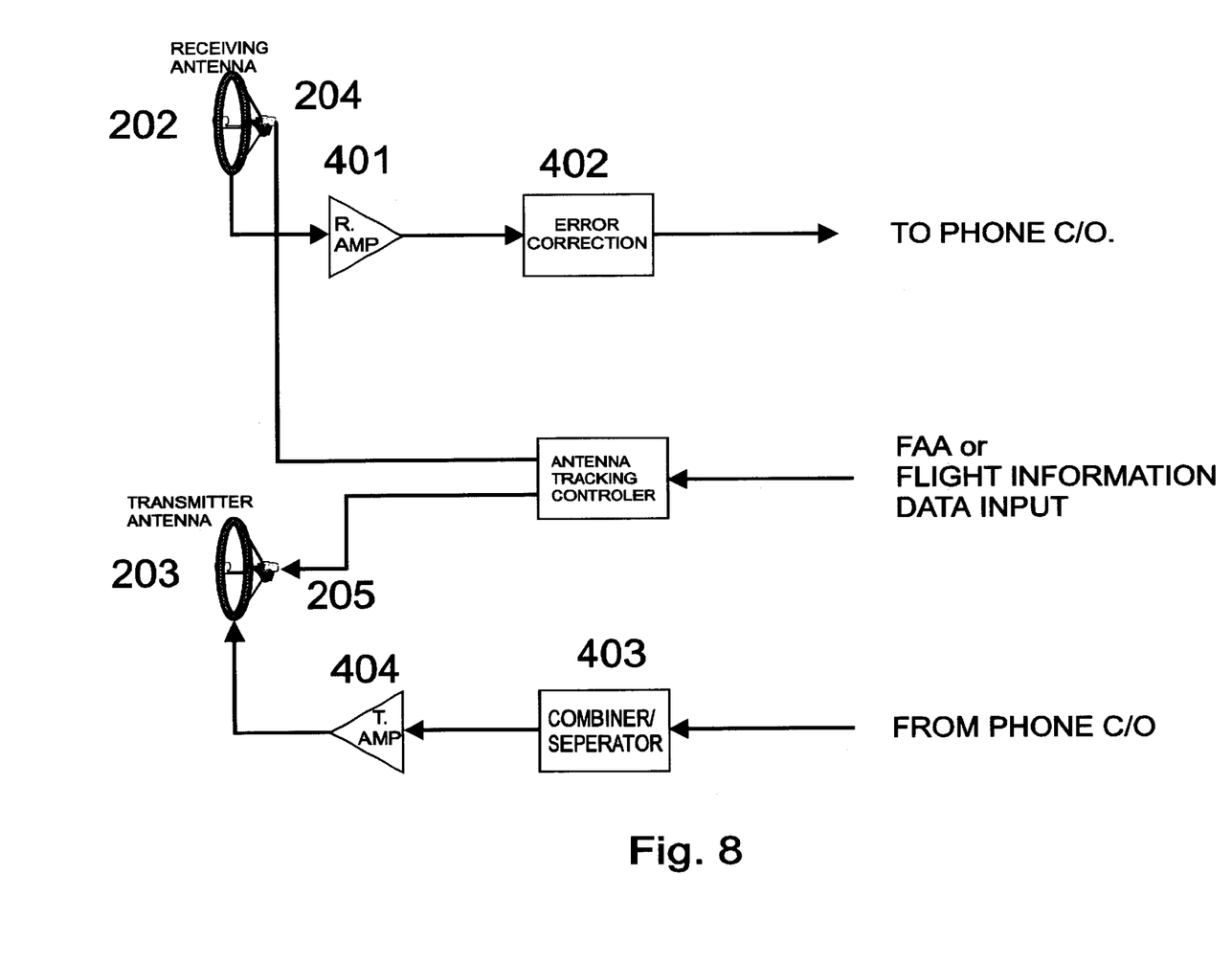
FIG. 8 shows the block diagram of the ground repeater equipment

Just like the conventional, typical and existing land-based microwave relay station; the ground base station has both the transmitter, receiver and high-gain tracking/directional antennas equipment and preferably is located at high altitude for it own line-of-sight coverage range. FIG. 8 shows the block diagram of the equipment in the microwave repeater station. Signals are received from phone central office, combined with local data (if any), modulated, amplified and transmitted to commercial aircraft. The receiving antenna receives signal from the adjacent aircraft then amplified, errors corrected and send to phone central office. The antennas are controlled by flight information such as Global Position System (GPS) data and tracked for the best receiving or transmitting results to the aircraft. Note that tracking the receiving and the transmitting antennas maybe a separate task since the ground station may receiving wireless signal from one aircraft but transmitting it to a different aircraft.

(2) Mobile Units Onboard the Commercial Aircraft

The mobile units are located on the aircraft which also has antennas, transmitters, receivers, plus data combiner/separator built-in onboard the aircraft. Note that two channels are required to provide full-duplex operation; the first channel relays the signal from 301 to 302 and the second channel relays the signal from 302 to 301.

Figure 4:
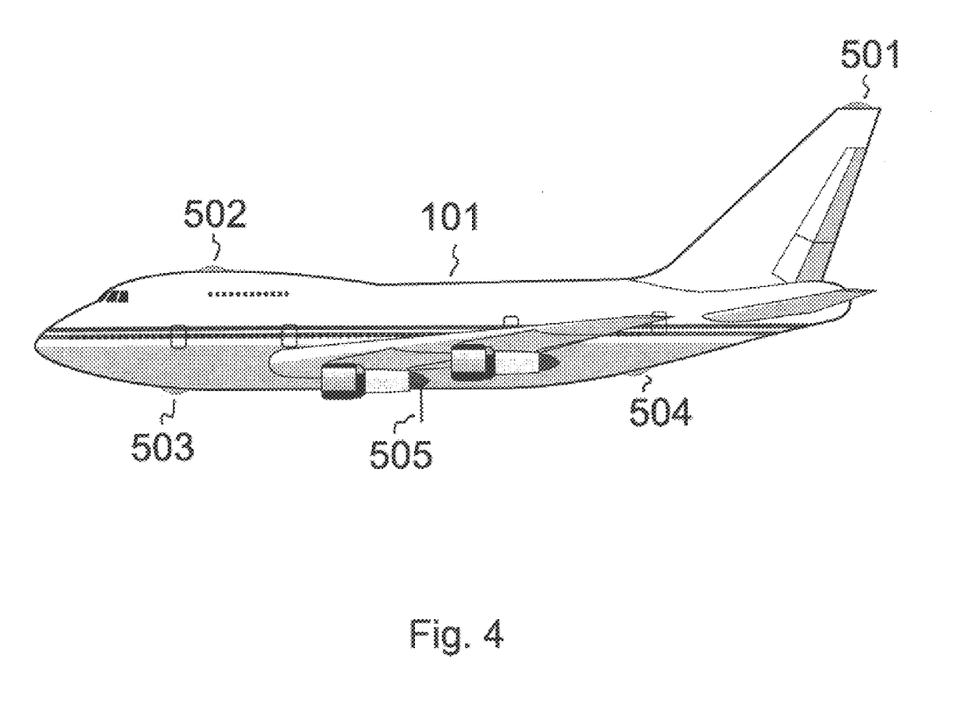
FIG. 4 shows the commercial aircraft with microwave antenna installed
Figure 5:
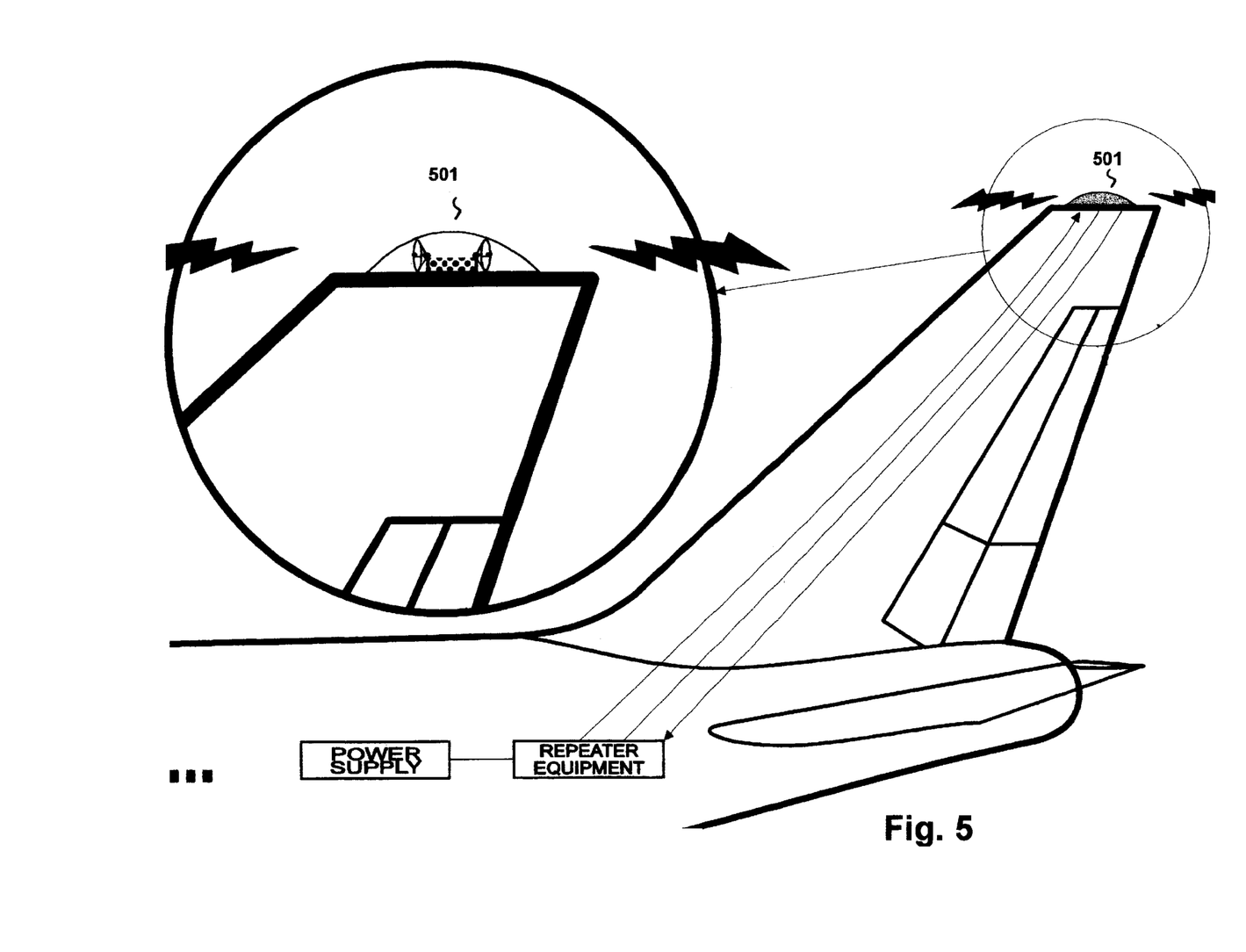
FIG. 5 shows the detailed antenna and repeater equipment on the aircraft
Figure 6:
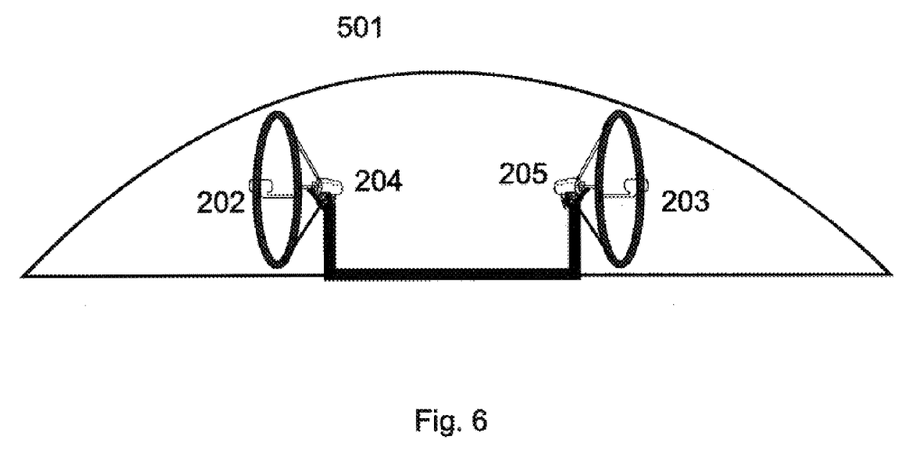
FIG. 6 shows the tracking antenna system inside the antenna dome

(a) The antenna system: the aircraft has to provide appropriate spaces for the antennas dome to be located. FIG. 4 shows up to four sets (at least two) 501 502 503 504 of antennas may be required (to avoid blind spot) for covering all the 3 dimensional positions and full duplex communication. FIG. 5 shows more detail of the antenna that installed on the aircraft. These antenna sets are self-tracking (can go up and down, left and right) 204 205 and controlled by gyrostabilizer and microprocessor 406 to maintain their positions. FIG. 6 shows the antenna that installed at the typical commercial aircraft in the antenna dome 401. Note the antennas are back to back that one is the receiving 202 and the other is the transmitting antenna 203.

Figure 7:
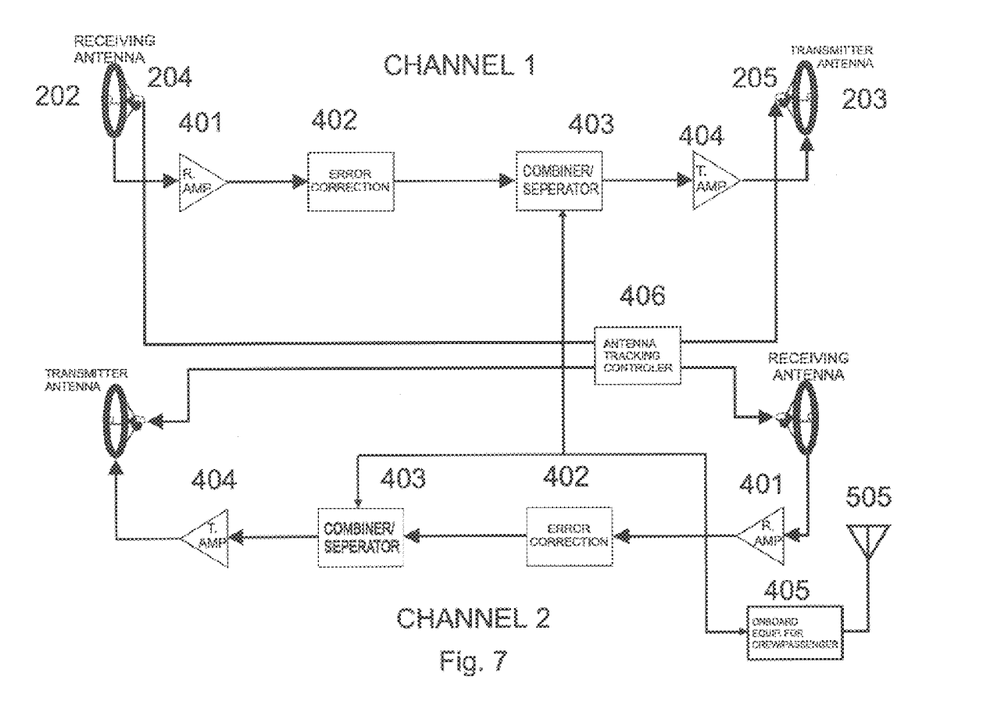
FIG. 7 shows the block diagram of the onboard repeater equipment

(b) The receiver: FIG. 7 shows the digital data is received from the antenna 202 then amplified 401 and errors corrected 402 for retransmission 404. Just like the satellite or underwater fiber optical cable, the signal is faded out due to long distance transmission and needs to be boosted and corrected before the retransmission.

(c) The transmitter: after the signal is reshaped and cleaned-up, the onboard transmitter retransmits the signal to the next commercial aircraft or ground station.

(d) The combiner/seperator unit 403: the onboard aircraft broad band data could be combined/seperated and transmitted or received. These broad band services could extend to not only the cabin passengers/crews but also provide the line-of-sight service to customers in its vicinities (use as transceiver 505). For example, small aircraft or ship beneath the commercial aircraft could benefit from its service as a flying cellular phone repeater. (tower)

(f) The position controller: 406 gyrostabilizer and computer maintains the tracking of the antenna.

Other Technical Details

1. Frequencies Use and Reuse

This hub to hub linkup system carries broad band wireless data requiring high microwave frequencies in the 30 Ghz range or higher. The higher the frequency the better the modulation factor and thus more data (digital bits) it can be carried. Frequencies are in the following categories: (Please note that the existing land-mobile microwave repeaters frequencies are already approved and licensed by FCC for these particular applications.)

1. Uplink frequency: special frequencies to use to transmit from ground to air.
2. Downlink frequency: special frequencies to use from aircraft to ground.
3. Interlink frequency: special frequencies to use between aircraft to aircraft. Need at least 2 sets of frequency at each direction to avoid interference.

2. Modulation of the Frequency

Digital format of data are preferred for phase modulation such as QPSK (Quadrature Phase Shift Key) or any modem modulation scheme such as Time Division Multiple Access (TDMA) or Code Division Multiple Access (CDMA), are also suggested.

3. Transmitting Power Level

The directional high-gain antenna, such as dish, antenna on board the aircraft (or on the ground) could easily provide 30 dB gain by narrowing the beam of the signal wave. Transmitting power can be low (100 Watts or less) since the maximum communication range is limited to only 500 miles. The power source at the commercial aircraft will be sufficient since all the aircraft has dedicated power generators onboard, unlike the satellite system whose sole source of power is its solar panels that provide very limited power to charges the battery.

For the interlink frequencies, since the commercial aircraft is traveling at "no-man's zone", the man-made radio frequency interference would be minimal, because signal-to-noise ratio (S/N) is high and the transmitting power could be reduced to save power, if necessary.

4. Bandwidth

Depending on modulation of the signal, modern technologies could easily reach OC-192 at 10 Gbps (Giga bits per seconds) with 1 bit of error over 100,000,000 bits transmitted.

5. Full-duplex Communication

The broad band wireless data has to be two way (both directions) to establish real time communication link and handshake operation. Two or more sets of equipment are provided onboard the aircraft to relay the broad band wireless data from point to point or multi-points to multi-points.

6. Communication Protocols

This linkup system provides a physical layer of the entire system.

7. Hand-off

The new replacement aircraft has to be fill-in within line-of-sight before the ground station signals completely fade out of the horizon for aircraft 101. Hand-off are only required from ground station to aircraft, not aircraft to aircraft, if these aircraft are all travel at the same direction, same speed and same altitude that stay within line-of-sight for their entire cruising periods.

8. Doppler Effect

Since each equipped commercial aircraft is traveling about the same speed, the Doppler effect could be pre-estimated and the signal timing clock recovery offset and corrected. Typical air speed is around 600 mile/hour. During takeoff or landing, the speed is reduced. The onboard equipment is therefore not useful (since the altitude is very low) and should be turned off anyway.

9. Propagation Delay

The commercial aircraft links up the signal with low minimal delay, Wireless link signals only travel along the flight path and don't go to the space (then come back) so the delay is equivalent to the underwater submarine fiber optics cable. The geo-stationary communication satellites have the worst propagation delay causing annoying echo for real-time phone conversations.

10. Non-real-time Wireless Data

The non-real-time data (such as E-mail data) can be stored and then forward after communication is reestablished.

D. Operation Details

1. Aircraft Type

The commercial aircraft capable of long range flight is required. Typical transoceanic aircraft such as Boeing 747 is ideal for this type of applications for now.

2. Infrastructures

Commercial airlines must coordinate and cooperate to maintain the fleets of the constellation. Passenger aircraft are sensitive to takeoff and landing time. The cargo jets are more flexible to fill in the constellation. Since the entire wireless linkup system is to serve as the wireless data bridge, the network environment can act as a simple gateway not a whole network. The broad band data could be received from phone companies such as OC-192 format (10 Gbits/sec) at the ground station and converted (modulated) to wireless format then transmitted to the first commercial aircraft and carried on. The receiving end is the same way as the transmitting end.

3. The System Flexibility

The equipped commercial aircraft offers tremendous flexibility (compared to other systems) that could easily reroute and relocate from one serving territory to another, unlike the fiber optics system or the geo-stationary communication satellites.

4. Maintenance

The crew of the commercial aircraft should decide to participate in equipment maintenance tasks over-the-air or wait until the plane landed for the service personnel, if the equipment fails. Unlike the communication satellite system, once it is fails, it's gone. The submarine fiber optics cable is better than the satellites, however, it is an extremely expensive task to locate the trouble and fix failed repeaters and cable under deep water. For the ground station, the maintenance is same as the typical microwave repeater station and no special tool or skill is required.

Thus the scope of the invention should be determined by the appended claims and their legal equivalents, rather than by the examples given.

What is claimed is:

1. A method of stimulating substantial business profits for the commercial airlines by providing broadband wireless communication gateway systems, comprising steps of:

(a) providing a plurality of commercial airline aircraft that would be equipped with at least one pair of broadband wireless repeaters onboard, (b) providing at least one pair of ground stations, each equipped with at least one said broadband wireless repeater, and serves as gateway for broadband wireless signals, (c) Grouping and reassigning of said commercial airline aircraft commuting between a plurality of point-to-point at predetermined schedules so said commercial airline aircraft would be at the right places, all the time during their flights to form a seamless chain of the said broadband wireless repeater network at line-of-sight ranges from each said commercial airline aircraft across the sky from said a plurality of point-to-point, and (d) transmitting broadband wireless signals from the source ground station to its nearby and in line-of-sight ranges flying said commercial airline aircraft where said broadband wireless signals are received, reconditioned then retransmitted to the next neighboring flying said commercial airline aircraft which are closer to the destination ground station, and so forth as the said broadband wireless signals leapfrog from said commercial airline aircraft to next said commercial airline aircraft, and then finally the said broadband wireless signals being received at the destination ground station, whereby said commercial airlines can be profitable by providing broadband communication wireless signals gateway services for ground based customers.

2. The method of claim 1, wherein said commercial airline aircraft flying at approximately the same direction, the same speed and same altitude regularly carry passengers, cargo, and combined passengers and cargo from points to points.

3. The method of claim 1, wherein said one pair of broadband wireless repeaters are two sets of microwave radio frequency signal relaying electronic devices that comprise a plurality of antennas, tracking, receivers, and transmitters system which track the antennas, receive, recondition and retransmit said broadband wireless signals for both directions at full-duplex operation.

4. The method of claim 1, wherein said broadband communication services are telephony, Internet related, video, e-mail and packet data.

5. The method of claim 1, wherein said commercial airlines provide broadband communication services for a fee for its gateway services customers.

6. A method of stimulating substantial business profits for the commercial airlines by providing broadband wireless communication systems for in-flight, and onboard commercial airline aircraft users, comprising steps of:

(a) providing a plurality of commercial airline aircraft that would be equipped with at least one pair of broadband wireless repeaters onboard and said broadband wireless repeaters would also have coupling means for broadband wireless services for onboard in-flight uses, (b) providing at least one pair of ground stations, each equipped with at least one said broadband wireless repeater, and serves as gateway for said broadband wireless signals, (c) Grouping and reassigning of said commercial airline aircraft commuting between a plurality of point-to-point at predetermined schedules so said commercial airline aircraft would be at the right places, all the time during their flights to form a seamless chain of the said broadband wireless repeater network at line-of-sight ranges from each said commercial airline aircraft across the sky from said a plurality of point-to-point, and (d) transmitting broadband wireless signals from the source ground station to its nearby and in line-of-sight ranges flying said commercial airline aircraft where said broadband wireless signals are received, reconditioned and coupled with in-flight use broadband signals then retransmitted to the next neighboring flying said commercial airline aircraft which are closer to the destination ground station, and so forth as the broadband wireless signals leapfrog from said commercial airline aircraft to next said commercial airline aircraft, and then finally the broadband wireless signals being received at the destination ground station, whereby said commercial airlines can be profitable by providing broadband communication services for airborne, in-flight, onboard aircraft customers.

7. The method of claim 6, wherein said commercial airline aircraft flying at approximately the same direction, same speed and same altitude regularly carry passengers, cargo, and combined passengers and cargo from points to points.

8. The method of claim 6, wherein said one pair of broadband wireless repeaters are two sets of microwave radio frequency signal relaying electronic devices that comprise a plurality of antennas, tracking, receivers, and transmitters system which track the antennas, receive, recondition and retransmit said broadband wireless signals for both directions at full-duplex operation.

9. The method of claim 6, wherein said coupling means are broadband signal switching, branching, and routing.

10. The method of claim 6, wherein said broadband communication services are telephony, internet related, video, e-mail and packet data.

11. The method of claim 6, wherein said commercial airlines provide broadband communication services for a fee for its onboard in-flight crews and passengers.

12. A method of stimulating substantial business profits for the commercial airlines by providing broadband wireless communication systems for overboard, along line-of-sight ranges of flights path uses, comprising steps of:

(a) providing a plurality of commercial airline aircraft that would be equipped with at least one pair of broadband wireless repeaters onboard and said broadband wireless repeaters would also have wireless coupling means for broadband wireless services for overboard, along line-of-sight ranges of light path uses, (b) providing at least one pair of ground stations, each equipped with at least one said broadband wireless repeater, and serves as gateways for broadband wireless signals, (c) Grouping and reassigning of said commercial airline aircraft commuting between a plurality of point-to-point at predetermined schedules so said commercial airline aircraft would be at the right places, all the time during their flights to form a seamless chain of the said broadband wireless repeater network at line-of-sight ranges from each said commercial airline aircraft across the sky from said a plurality of point-to-point, (d) transmitting broadband wireless signals from the source ground station to its nearby and in line-of-sight ranges flying said commercial airline aircraft where said broadband wireless signals are received, reconditioned and wirelessly coupled with overboard uses broadband wireless signals then retransmitted to the next neighboring flying said commercial airline aircraft which are closer to the destination ground station, and so forth as the broadband wireless signals leapfrog from said commercial airline aircraft to next said commercial airline aircraft, and then finally the broadband wireless signals being received at the destination ground station, and (e) providing hand-off means to maintain uninterrupted broadband communication services, new substitute said commercial airline aircraft have to fill-in between current link of the said commercial airliner aircraft to said overboard customers before the signals link from the said commercial airline aircraft completely fade-out since the current linking from said commercial airline aircraft that departing from the said overboard line-of-sight coverage ranges, whereby said commercial airlines can be profitable by providing broadband communication services for customers overboard, along line-of-sight ranges of the flight paths.

13. The method of claim 12, wherein said commercial airline aircraft flying at approximately the same direction, same speed and same altitude regularly carry passengers, cargo, and combined passengers and cargo from points to points.

14. The method of claim 12, wherein said one pair of broadband wireless repeaters are two sets of microwave radio frequency signal relaying electronic devices that comprise a plurality of antennas, tracking, receivers, and transmitters system which track the antennas, receive, recondition and retransmit said broadband wireless signals for both directions at full-duplex operation.

15. The method of claim 12, wherein said wireless coupling means comprising: airborne broadband wireless signals switching, branching, routing, antenna tracking, transmitting and receiving for servicing broadband wireless signals to customers overboard and along line-of-sight ranges of flight paths.

16. The method of claim 12, wherein said broadband communication services are telephony, internet related, video, e-mail and packet data.

17. The method of claim 12, wherein said commercial airlines provide broadband wireless communication services for a fee for customers overboard and along line-of-sight ranges of flight paths.

* * * * *